Dec. 22, 1970  B. CONRAD  3,548,672
AUTOMATICALLY CONNECTIBLE AND DISCONNECTIBLE GEAR TRAIN
Filed March 26, 1969  2 Sheets-Sheet 1

INVENTOR
BYRON CONRAD
BY
Nolte & Nolte
ATTORNEYS

Dec. 22, 1970            B. CONRAD            3,548,672
AUTOMATICALLY CONNECTIBLE AND DISCONNECTIBLE GEAR TRAIN
Filed March 26, 1969            2 Sheets-Sheet 2
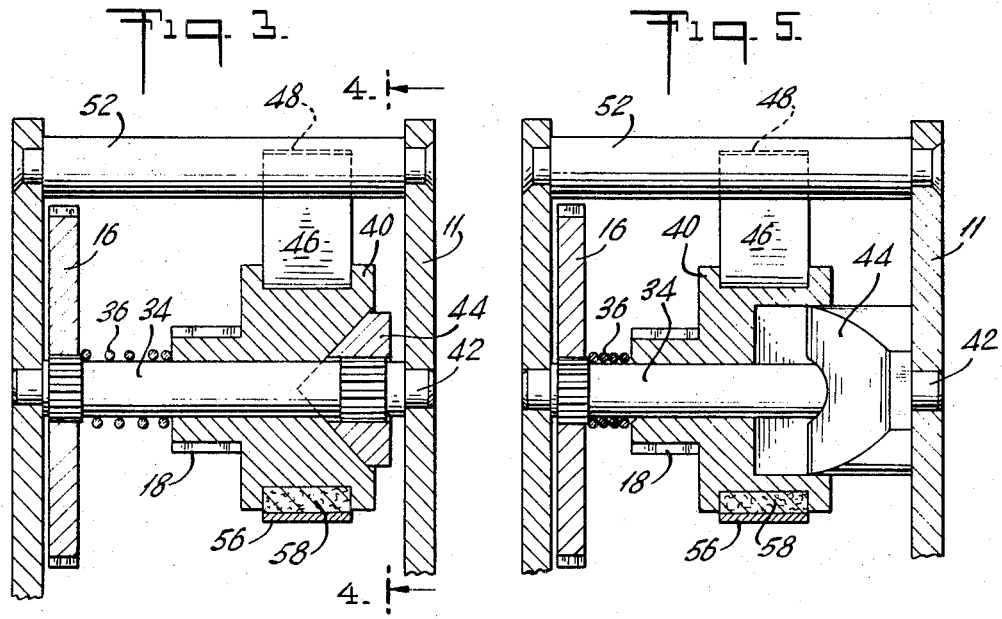
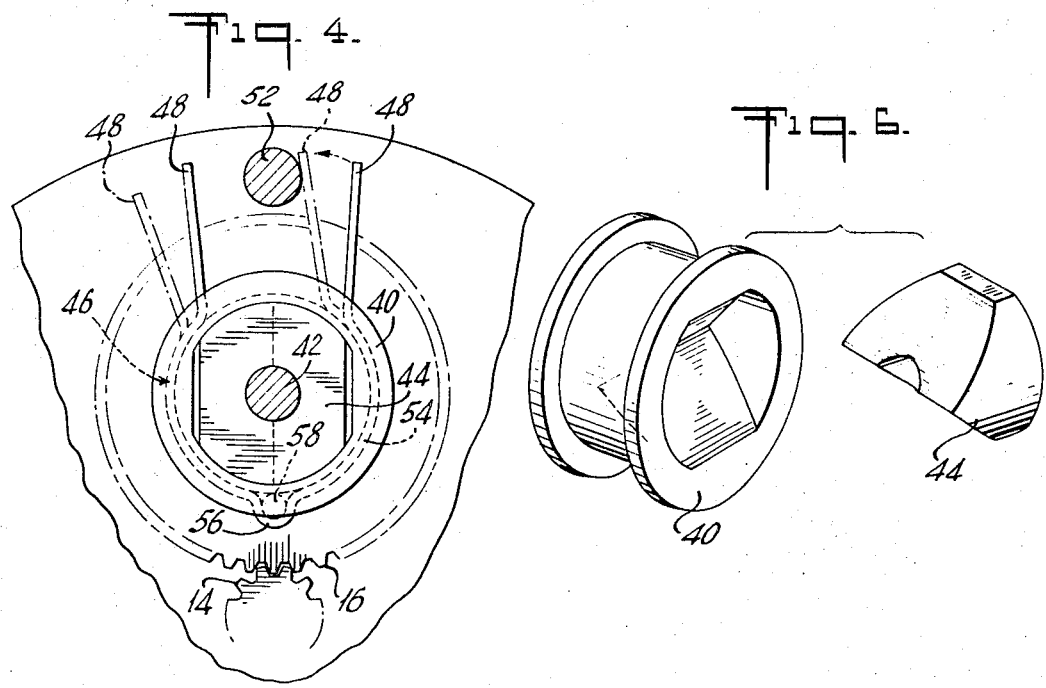
INVENTOR
BYRON CONRAD
BY
Nolte & Nolte
ATTORNEYS United States Patent Office 3,548,672
Patented Dec. 22, 1970

3,548,672
AUTOMATICALLY CONNECTIBLE AND DISCONNECTIBLE GEAR TRAIN
Byron Conrad, Columbus, Nebr., assignor to Dale Electronics, Inc., Columbus, Nebr., a corporation of Nebraska
Filed Mar. 26, 1969, Ser. No. 810,726
Int. Cl. F16h *57/00, 35/18*
U.S. Cl. 74—405                                                    7 Claims

ABSTRACT OF THE DISCLOSURE

A motorized potentiometer in which the gear train can be disengaged to selectively operate the potentiometer manually. The device has an axially movable clutch which moves linearly to a position whereby the gear train is engaged. Thereafter, the friction of a spring, which initially prevents rotation of the coupling, is overcome and the latter rotates within the friction spring thereby resulting in a motorized potentiometer drive.

BACKGROUND OF THE INVENTION

Motorized potentiometers are known in which the driving member is a clutch that moves axially to either engage or disengage a gear train of the potentiometer. When the gear train is disengaged the potentiometer may be manually operated, however, when the motor is powered, the gear train is moved by means of the motor through the aforesaid clutch arrangement. In these known arrangements, the clutch shaft is movable axially and is provided with a magnetic slug which moves between the stator structure of a motor. The motor is also reversible, thereby permitting the clutch to engage the gear train and rotate it either in a clockwise direction or in a counterclockwise direction. Another known construction of a motorized potentiometer features the use of a yoke which pivots on part of the frame and has an intermediate gear arrangement whereby these gears may be connected alternately to output gears and thereby rotate the potentiometer in a clockwise or a counterclockwise direction. When the motor is deactivated, the intermediate gears are located in an inoperative position relative to the output gears. The present invention is directed to a clutch mechanism for a small gear train that is suitable for driving a potentiometer, the latter being, for example, used in a remote control TV set or other similar apparatus.

SUMMARY OF THE INVENTION

A principal object of the present invention is to provide an assembly in which the unit disengages a gear train when the driving gear is no longer driven so that the output gear may be turned manually without turning the driving motor. In addition, the clutch of the present invention will engage the motor gear train regardless of the direction the driving gear is moving.

Another object of the present invention is to provide a motorized potentiometer which has fewer parts and in which the clutch is simplified and may be fabricated of molded plastic material. Other objects, features and advantages of the invention will become apparent from the following description when read with reference to the accompanying drawings.

BRIEF DESCRIPTION OF THE DRAWINGS

FIG. 3 is a sectional view of the clutch assembly arrangement of the invention, with the clutch in its disengaged position;

FIG. 4 is a view of the friction spring taken along the lines 4—4 of FIG. 3;

FIG. 5 is a sectional view of the clutch assembly similar to the view of FIG. 3, however with the clutch in its engaged position;

FIG. 6 is an exploded view of the details of the coupling part and wedge; and

Figure 1:
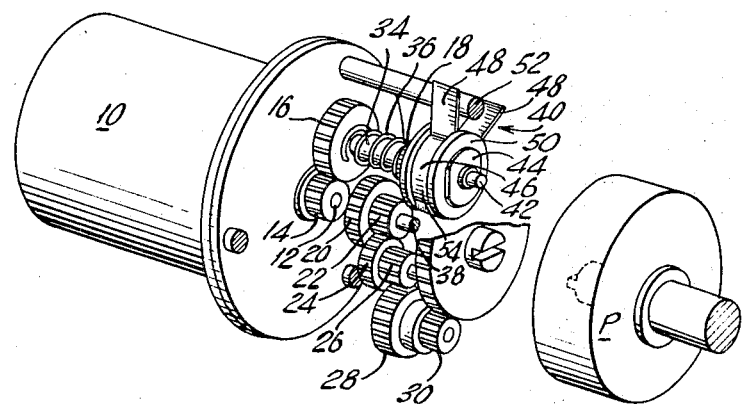
FIG. 1 is a partial perspective and a partial exploded view of a motorized-potentiometer construction embodying the principles of the invention.

Referring to the drawings, a motor 10 is provided with a drive shaft 12 and affixed to the free end of the drive shaft 12 is a driving gear 14. Gear 14 is adapted to engage a gear train having gears 16, 18, 20, 22, 24, 26, 28, 30 and 32 respectively. All of the gears and associated structure are mounted within a frame 11. Gears 16 and 18 are operable on a clutch shaft 34 having an helical compression coil 36 therebetween. The driving gear 14 is shown meshed with gear 16 of the clutch shaft 34. Gears 20 and 22 are mounted on shaft 38. The compression spring 36 is adapted to be compressed and expanded on clutch shaft 34. In addition, the coupling part 40 which is in the form of a spool (FIG. 6) movable linearly and coaxially along the clutch shaft 34, and the movement thereof causes the compression and expansion of said spring 36. Fixed to the end 42 of the clutch shaft 34 is a wedge element 44. It should be noted that wedge element is permanently attached to the end of the shaft and moves therewith. The construction of the coupling part 40 and wedge element 44 is clearly seen in FIG. 6. The friction spring 46 is shown having legs 48 that are adapted to engage the post 52, as clearly seen in FIG. 4 of the drawings. Furthermore the loop portion 54 of the friction spring 46 fits over the spool of the coupling part 40. The legs 48 of spring 46 are adapted to move along the stationary post 52. However, the post 52 permits a small amount of rotational movement of the legs 48 but prevents the spring 46 from rotating either clockwise or counterclockwise in significant amounts and restricts the movement of the spring 46 to linear movement. This is clearly shown in FIG. 4 of the drawings.

Figure 2:
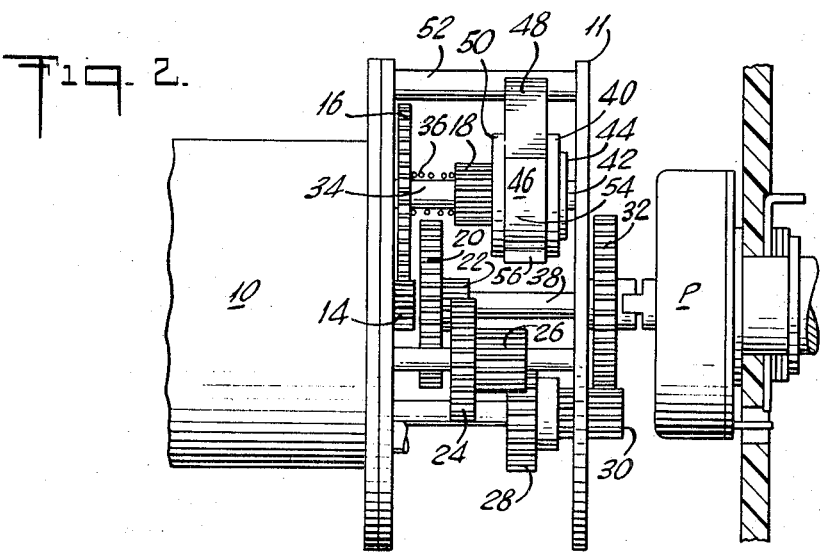
FIG. 2 is a side elevational and a sectional view thereof, with the clutch assembly in its disengaged position.
Figure 7:
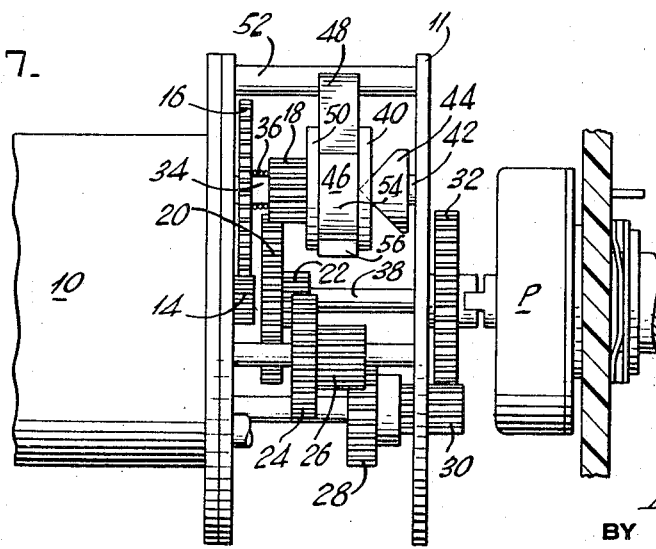
FIG. 7 is a side elevational and sectional view similar to FIG. 2, however with the clutch assembly in its engaged position.

The clutch assembly shown in the drawings operates as follows:

Normally, the gear train is in a disengaged position as shown in FIG. 2. However, when the driving gear 14 turns the clutch shaft 34, the wedge 44 is rotated within the drum portion 50 of the coupling 40 causing the coupling 40 to move to the left as shown in FIG. 7 by a camming action. When this occurs, the gear 18 on the clutch shaft meshes with the gear 20 on the gear train and this results in a direct gear arrangement drive between the motor and the potentiometer.

The friction spring 46 rotates slightly until one of the legs 48 abuts the stationary post 52. At this point, the spring 46 no longer rotates but moves linearly with the coupling part 40 along the clutch shaft 34 upon the continual application of force to the coupling part.

It should be noted that the friction spring 46 slips on the outside of the drum portion 50 of the coupling as the driving gear 14 continues to turn the gear train and the friction forces of the friction spring 46 on the coupling part 40 are overcome and the gears 18 and 20 are in mesh. The wedge 44, seated in the coupling does not come out of the recess in the coupling 40 and hence the wedge continues to rotate the coupling 40 and its attached gear as long as the drive gear is connected to a power source, and power applied thereto. The same sequence of operation occurs when the drive gear 14 is rotated in the opposite direction.

The friction spring 44 is furthermore provided with an indentation in the upper part of the loop 54 thereof. This indentation 56 has a small cylinder of felt 58 located therein which is soaked with oil. Therefore, a continuous supply of oil is made available in order to lubricate the part of the friction spring that is in contact with the drum 50 of the coupling part 40.

As shown in FIGS. 2 and 3, the gear 18 may be disengaged from the gear 20 and therefore, the potentiometer may be operated manually. As shown in FIG. 7, the spring 36 is compressed so that when the motor 10 is stopped, the spring 36 automatically forces the gears 18 and 20 out of engagement as stated above.

What is claimed is:

1. A motorized potentiometer combination comprising a driving gear operatively connected to the motor, a stationary frame located between said motor and potentiometer, a rotatable clutch shaft mounted in said frame and spaced from said driving gear, a gear train also mounted in said frame and operatively connected to said potentiometer but disconnected from said driving gear, a first gear on said clutch shaft continuously driven by said driving gear, a coupling provided with a recess therein and positioned on said clutch shaft spaced from said first gear, said coupling being provided with a second gear operatively connected thereto, both said coupling and second gear being adapted to rotate with and move linearly along said clutch shaft, a compression spring freely positioned on said clutch shaft between said first and second gears, a wedge element rigidly secured to the free end of said rotatable clutch shaft and engaged with said recess, and a friction spring on said coupling which when the clutch shaft rotates prevents the full rotation of said coupling until said wedge element moves said coupling linearly whereby said second gear engages one of the gears of said gear train to thereby provide a driving connection between said motor and potentiometer.

2. A motorized potentiometer combination as claimed in claim 1 wherein said coupling is a spool, and said friction spring has a part thereof engaging the exterior of said spool, and another part thereof constituting a pair of spaced legs which alternately engage a part of said stationary frame.

3. A motorized-potentiometer combination as claimed in claim 2 wherein said part of the friction spring engages the exterior of said spool is adapted to slide on said spool when the frictional force of the part resisting sliding is overcome by the compression of said compression spring and the driving force transmitted therethrough.

4. A motorized-potentiometer combination as claimed in claim 1 wherein the recess in said coupling is V-shaped in cross-section, and said wedge element is correspondingly-shaped.

5. A motorized-potentiometer combination as claimed in claim 3 further comprising an indentation in the part thereof engaging the exterior of said spool, and a lubrication means positioned in said indentation for lubricating said sliding part.

6. A motorized-potentiometer combination as claimed in claim 5 wherein said lubrication means is a felt cylinder impregnated with oil.

7. A motorized potentiometer combination as claimed in claim 2, wherein said spool is provided with spaced end flanges and the part of said spring engaging the exterior of said spool substantially surrounds the exterior surface of said spool located between said spaced end flanges, the latter preventing the lateral movement of said spring relative to said spool.

References Cited

UNITED STATES PATENTS

| | | | |
|---|---|---|---|
| 1,512,478 | 10/1924 | Nelson | 74—405 |
| 2,258,815 | 10/1941 | Schwarz et al. | 74—405 |
| 3,148,345 | 9/1964 | Moran | 74—10.8 |
| 3,415,130 | 12/1968 | Fichter | 74—337.5X |
| 3,447,387 | 6/1969 | Berenbaum | 74—10.8 |

MARK M. NEWMAN, Primary Examiner

T. C. PERRY, Assistant Examiner

U.S. Cl. X.R.

74—10.8, 337.5, 625